(12) United States Patent
Huang et al.

(10) Patent No.: US 10,728,248 B2
(45) Date of Patent: Jul. 28, 2020

(54) VALIDATING TOLL-FREE ACCESS TO STREAMING MEDIA CONTENT USING A SIGNATURE

(71) Applicant: Verizon Patent and Licensing Inc., Arlington, VA (US)

(72) Inventors: Jian Huang, Sudbury, MA (US); Susan Kelly, Maynard, MA (US); Fred Scheer, North Andover, MA (US); Chunyan Du, Bedford, MA (US); Gong Zhang, Waltham, MA (US); Fnu Bongu Huma Shankar Rao, Waltham, MA (US)

(73) Assignee: Verizon Patent and Licensing, Inc., Basking Ridge, NJ (US)

( * ) Notice: Subject to any disclaimer, the term of this patent is extended or adjusted under 35 U.S.C. 154(b) by 651 days.

(21) Appl. No.: 14/813,323

(22) Filed: Jul. 30, 2015

(65) Prior Publication Data

US 2017/0034170 A1    Feb. 2, 2017

(51) Int. Cl.
*H04L 29/06*    (2006.01)
(52) U.S. Cl.
CPC .......... *H04L 63/10* (2013.01); *H04L 63/0823* (2013.01); *H04L 65/102* (2013.01); *H04L 65/60* (2013.01)

(58) Field of Classification Search
CPC ... H04L 63/10; H04L 63/0823; H04L 65/102; H04L 65/60
See application file for complete search history.

(56) References Cited

U.S. PATENT DOCUMENTS

| 9,317,677 | B1* | 4/2016 | Scott | G06F 21/128 |
|---|---|---|---|---|
| 2012/0278229 | A1* | 11/2012 | Vishwanathan | G06Q 20/123 705/40 |
| 2015/0007312 | A1* | 1/2015 | Pidathala | H04L 63/145 726/22 |
| 2015/0373523 | A1* | 12/2015 | Jeong | H04W 4/24 455/406 |
| 2017/0006451 | A1* | 1/2017 | Mandanapu | H04L 43/028 |
| 2017/0171103 | A1* | 6/2017 | Gouache | H04N 21/23439 |

\* cited by examiner

*Primary Examiner* — Linglan E Edwards
*Assistant Examiner* — Forrest L Carey

(57) ABSTRACT

A device may determine a resource identifier for accessing a segment of streaming media content. The device may determine that a signature associated with the resource identifier is not stored in memory. The signature may be generated based on a character string of the resource identifier. The device may request validation of the resource identifier based on determining that the signature is not in memory. The device may receive the signature associated with the resource identifier based on requesting validation. The device may store the signature based on receiving the signature. The device may request the segment of streaming media content using the resource identifier and the signature, stored in memory, to receive toll-free access to the segment of streaming media content.

20 Claims, 11 Drawing Sheets

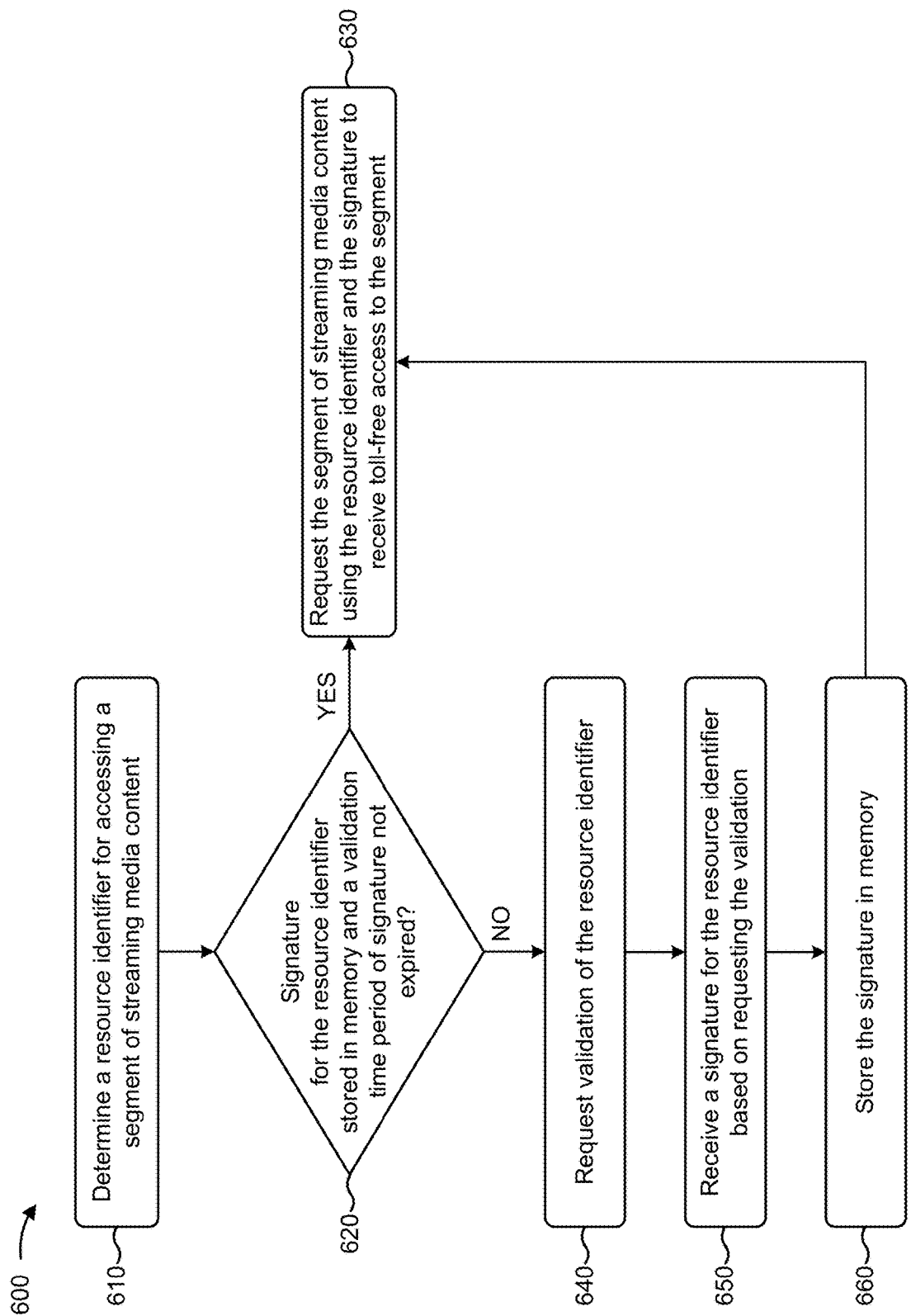

US 10,728,248 B2

VALIDATING TOLL-FREE ACCESS TO STREAMING MEDIA CONTENT USING A SIGNATURE

BACKGROUND

Service providers, such as online media companies, may wish to deliver streaming media content to network users. Network users may pay a network data usage fee to access the content. Some service providers may choose to subsidize the cost of network data usage, associated with the streaming media content, which would otherwise be paid by the network users accessing the content.

BRIEF DESCRIPTION OF THE DRAWINGS

FIG. 6 is a flow chart of an example process for validating a resource identifier with a signature to receive toll-free access to streaming media content;

DETAILED DESCRIPTION OF PREFERRED EMBODIMENTS

Figure 1:
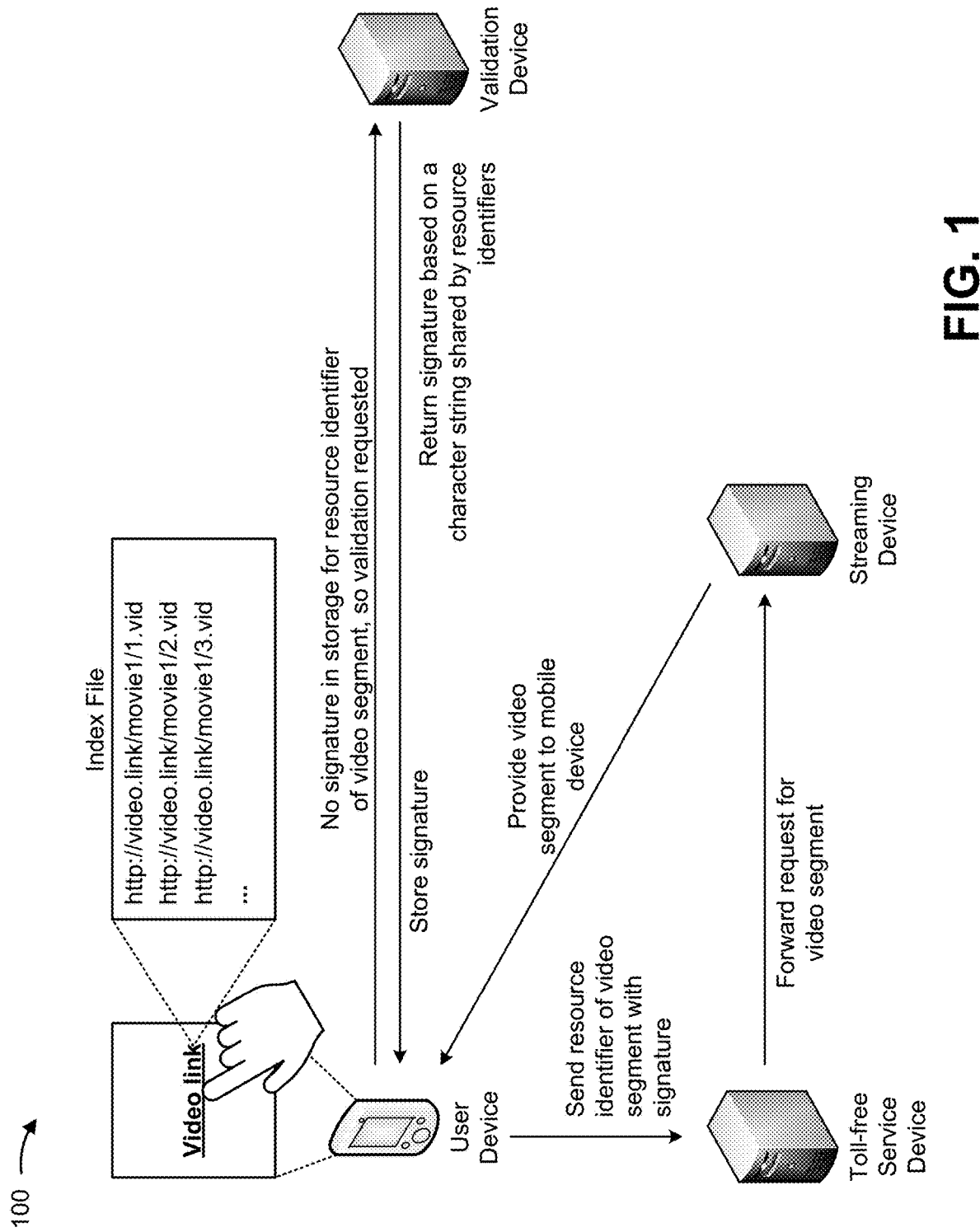
FIG. 1 is a diagram of an overview of an example implementation described herein.

The following detailed description of example implementations refers to the accompanying drawings. The same reference numbers in different drawings may identify the same or similar elements.

A service provider may want to provide streaming media content (e.g., video content such as a video file, or audio content such as an audio file) to a network user. The service provider may want to subsidize the cost of network data usage associated with the streaming media content, which would ordinarily be charged to the network user. A network operator may want to ensure that network data usage is charged to the appropriate party (e.g., either the service provider or the network user). One way to ensure appropriate charges is to convert a non-toll free resource identifier (e.g., a uniform resource identifier such as a uniform resource locator (URL)) for a resource (e.g., a streaming media content) to a toll-free resource identifier. If the non-toll free resource identifier is used to access the resource, then the network operator may charge the network user for network data usage. If the toll-free resource identifier is used to access the resource, then the network operator may charge the service provider for network data usage.

However, streaming media content may be broken into segments associated with time periods of the streaming media content to allow for adaptive streaming based on network conditions. For each of these segments, there may be more than one file associated with the segment that provide the segments of media content at different bit rates. Each file for the segment at different bit rates may have a unique resource identifier. The resource identifiers may be indexed in one or more index files that order the segments by time period and split the media content into different bit rates. Additionally, or alternatively, the streaming media content may have more than one host (e.g., a content delivery network (CDN)). Segments of media content associated with one host may have different resource identifiers than segments of media content associated with another host. Therefore, creating a toll-free resource identifier for each segment of streaming media content would be inefficient and not scalable. Furthermore, creating a new resource identifier for each segment of streaming media content may create latency issues as resource identifiers are converted while the media content is being streamed.

Implementations described herein may make the process of tracking network data usage of streaming media content less burdensome by implementing toll-free access to streaming media content using a signature. The signature may be applied to many resource identifiers associated with the streaming media content and may be stored locally on a user device. Therefore, use of the signature may reduce traffic and improve efficiency when compared to the process of converting each resource identifier, associated with the streaming media content, into a toll-free resource identifier.

FIG. 1 is a diagram of an overview of an example implementation 100 described herein. As shown in FIG. 1, assume that example implementation 100 includes a user device, a validation device, a toll-free service device, and a streaming device. Assume that a user of the user device is attempting to access a video by clicking on a link associated with the video. Assume that the video is a toll-free resource and that network data usage associated with the toll-free resource will be charged to a service provider. The video link provides access to an index file, which is an ordered list of resource identifiers associated with video segments of the video. In the example shown, the index file includes three resource identifiers, shown as "video.link/movie1/1.vid," "video.link/movie1/2.vid," and "video.link/movie1/3.vid," ordered from first to last.

As further shown in FIG. 1, assume that the user device has no signature in storage for the first resource identifier ("http://video.link/movie1/1.vid") and requests validation of the resource identifier by the validation device. The validation device generates and returns a signature, to the user device, based on a character string included in the resource identifier ("video.link/movie1/"), as shown. A signature based on "video link/movie1/" can be used to validate "http://video.link/movie1/1.vid," "http://video.link/movie1/2.vid," and any other resource identifier which includes the character string. Upon receipt of the signature, the user device stores the signature for future use. Furthermore, the user device sends the signature and the resource identifier to the toll-free service device. The toll-free service device identifies the resource identifier as being associated with a toll-free data service based on the signature. The toll-free service device then forwards the request, for the video segment, to the streaming device where the video segment is stored. In turn, the streaming device provides the video segment to the user device. The streaming device may provide the video segment to the user device. The toll-free service device may accrue network data usage, associated with providing the video segment to the user device, and may charge the service provider, rather than the user device, for the network data usage. The toll-free service device may use the signature to associate the network data usage with the service provider. The user device may use the stored signature for the second resource identifier ("http://video.link/movie1/2.vid"), the third resource identifier ("http://video.link/movie1/3.vid"), etc., because the character string is included in each of these resource identifiers.

By using the signature to validate toll-free access to streaming media content, network traffic may be reduced and processor and memory resources may be saved. Each resource identifier no longer has to be validated individually like it would if a toll-free resource identifier was created for each resource identifier.

Figure 2:
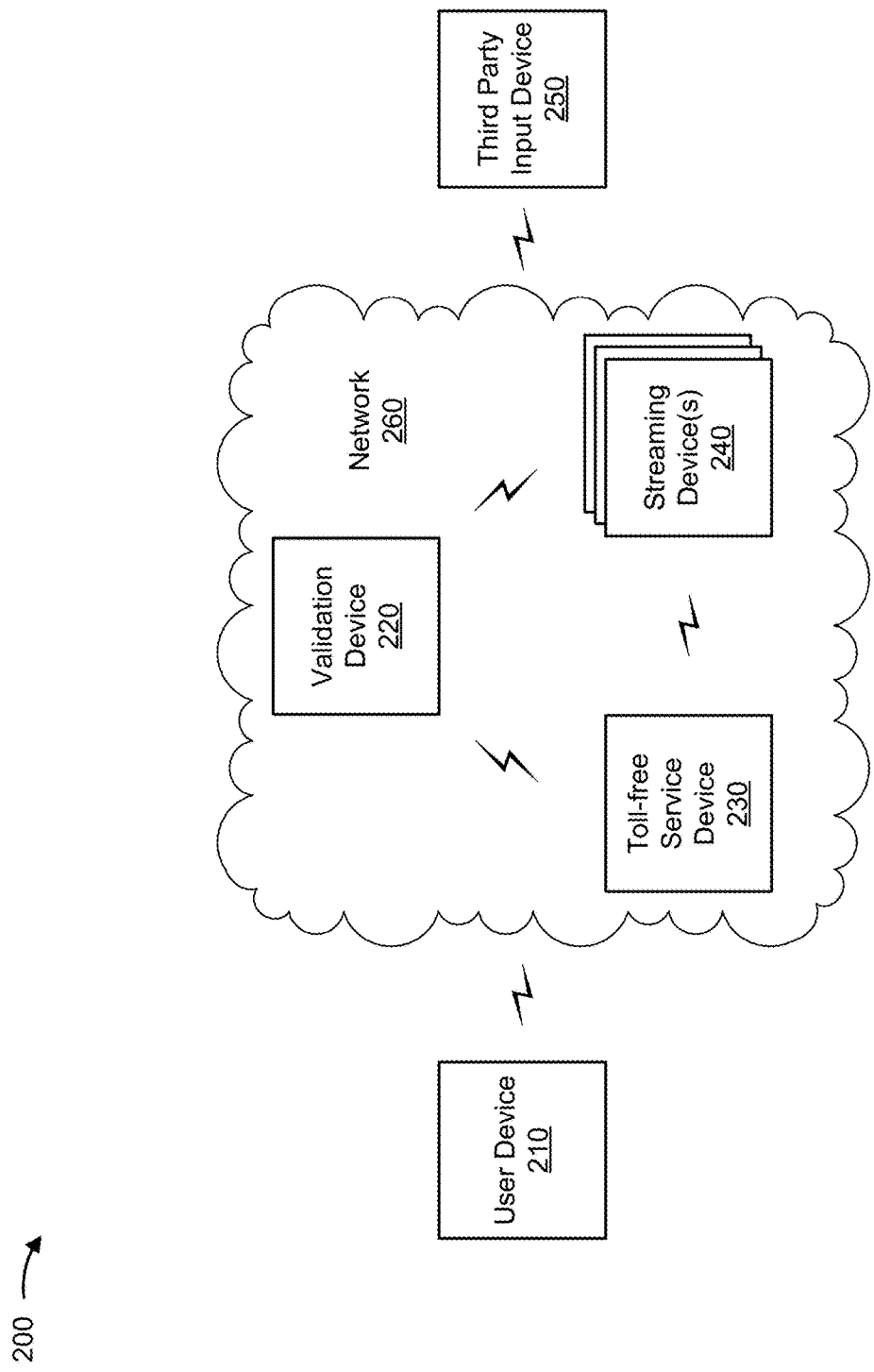
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a validation device 220, a toll-free service device 230, a streaming device 240, a third party input device 250, and a network 260. Devices of environment 200 may interconnect via wired connections, wireless connections, or a combination of wired and wireless connections.

User device 210 may include one or more devices capable of receiving, generating, storing, processing, and/or providing information associated with a segment of media content. For example, user device 210 may include a computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), a set-top box, or a similar type of device. In some implementations, user device 210 may be associated with an account that is charged based on network data usage by user device 210. Additionally, or alternatively, there may be a threshold data limit for the account associated with user device 210.

In some implementations, user device 210 may identify a resource identifier associated with a segment of media content, and may send the resource identifier to validation device 220 for validation. Additionally, or alternatively, upon validation by validation device 220, user device 210 may receive a signature from validation device 220 and store the signature for future use. Additionally, or alternatively, user device 210 may request a segment of streaming media content using the resource identifier and the signature, from streaming device 240, via toll-free service device 230.

Validation device 220 may include one or more devices capable of receiving, processing, storing, generating, and/or providing information associated with toll-free data services. For example, validation device 220 may include a computing device, such as a server (e.g., an authentication server, a firewall, etc.), a network device, or a similar device. In some implementations, validation device 220 may receive information about registering a resource identifier, from third party input device 250, associated with streaming media content. Additionally, or alternatively validation device 220 may generate a signature based on the information about registering the resource identifier. In some implementations, validation device 220 may receive a validation request from user device 210 that includes the resource identifier. Additionally, or alternatively, validation device 220 may send the signature to user device 210 when the validation request is received.

Toll-free service device 230 may include one or more devices capable of receiving, processing, storing, generating, providing, and/or routing information related to toll-free services. For example, toll-free service device 230 may include a computing device, such as a server (e.g., an authentication server, a firewall, etc.), a network device (e.g., a traffic transfer device, a gateway (e.g., a packet data network (PDN) gateway), a router, a modem, a switch, a firewall, a hub, a bridge, a load balancer, etc.), or a similar device. In some implementations, toll-free service device 230 may receive a request, from user device 210, for a segment of streaming media content. The request for a segment of streaming media content may include a resource identifier and a signature. Toll-free service device 230 may check to ensure that the signature is associated with the character string of the resource identifier. Additionally, or alternatively, toll-free service device 230 may forward the request for the segment of streaming media content to a particular streaming device 240 associated with the streaming media content. In some implementations, toll-free service device 230 may receive the segment of streaming media content from the particular streaming device 240 and provide the segment to user device 210. Additionally, or alternatively, toll-free service device 230 may tally the network data usage associated with the streaming media content for billing purposes.

Streaming device 240 may include one or more devices capable of receiving, processing, storing, and/or providing information associated with streaming media content. For example, streaming device 240 may include a computing device, such as a server (e.g., an application server, a host server, etc.), a network device, or a similar device. In some implementations, streaming device 240 may receive a request for a segment of streaming media content from user device 210 via toll-free service device 230. Additionally, or alternatively streaming device 240 may transmit the segment of streaming media content to user device 210 either directly or via toll-free service device 230 or another device.

Third party input device 250 may include one or more devices capable of receiving, generating, storing, processing, and/or providing information associated with streaming media content. For example, third party input device 250 may include a computing device, such as a server, a mobile phone (e.g., a smart phone, a radiotelephone, etc.), a laptop computer, a tablet computer, a handheld computer, or a similar type of device. In some implementations, third party input device 250 may provide information for registering a resource identifier to validation device 220.

Network 260 may include one or more wired and/or wireless networks. For example, network 260 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
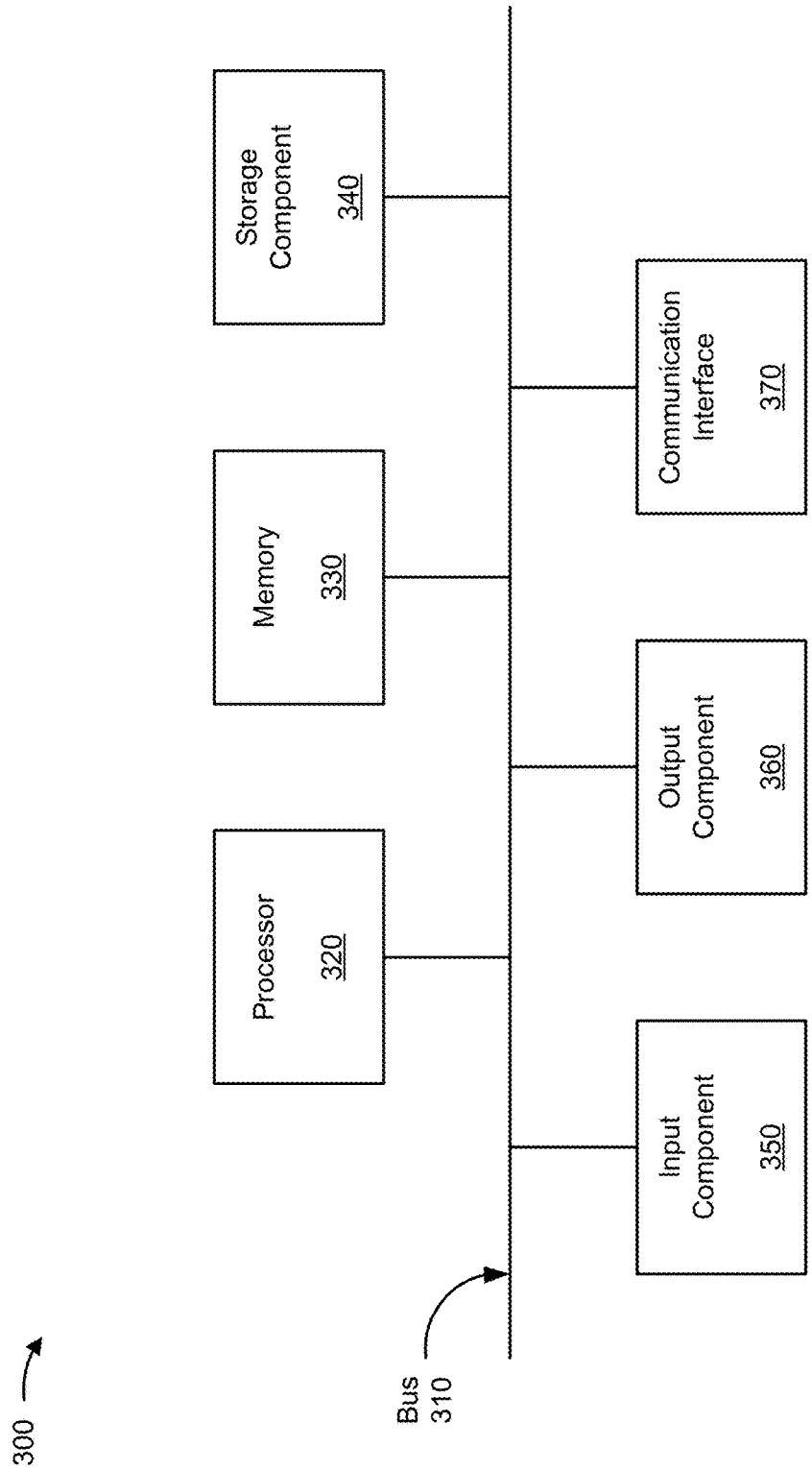
FIG. 3 is a diagram of example components of one or more devices of FIG. 2.

FIG. 3 is a diagram of example components of a device 300. Device 300 may correspond to user device 210, validation device 220, toll-free service device 230, streaming device 240, and/or third party input device 250. In some implementations, user device 210, validation device 220, toll-free service device 230, streaming device 240, and/or third party input device 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that can be programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
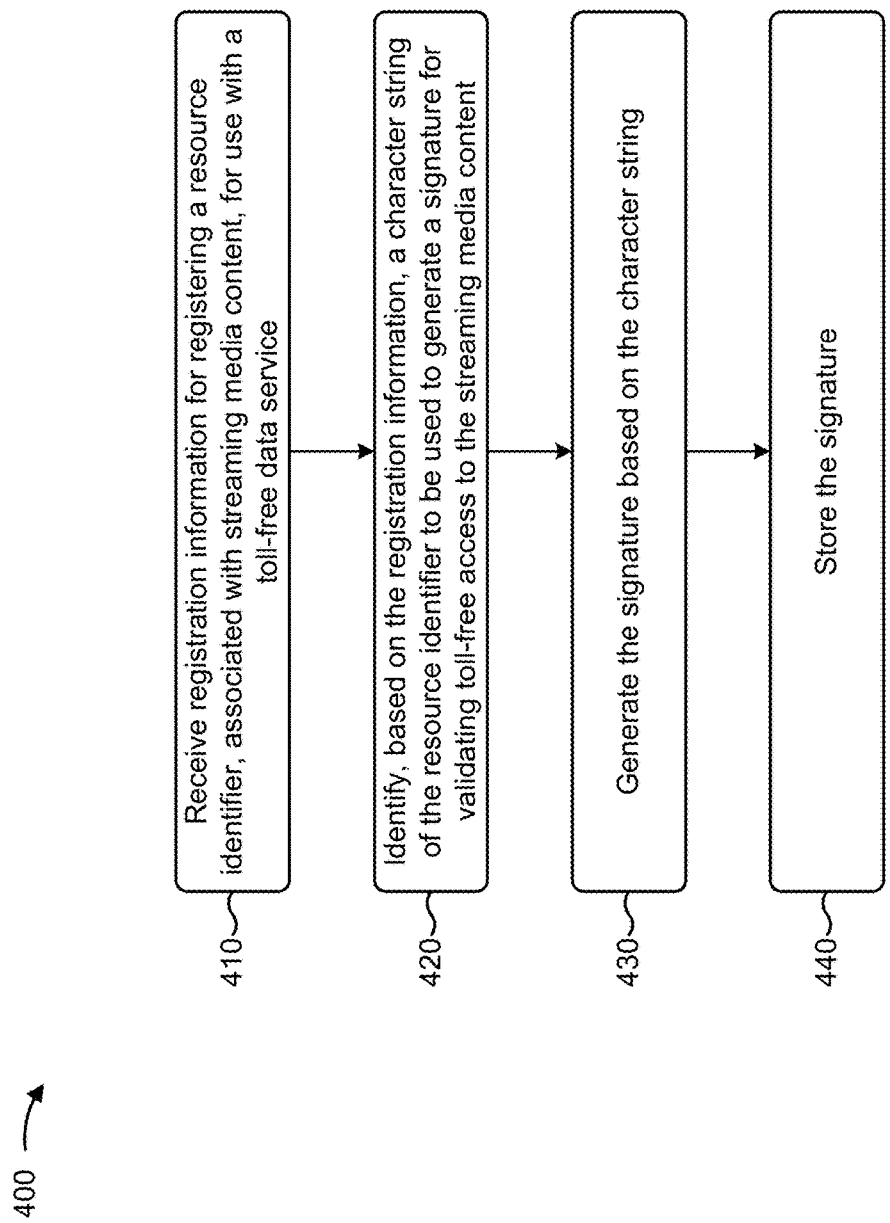
FIG. 4 is a flow chart of an example process for creating a signature for a resource identifier, associated with streaming media content, registered for a toll-free data service.

FIG. 4 is a flow chart of an example process 400 for creating a signature for a resource identifier, associated with streaming media content, registered for a toll-free data service. In some implementations, one or more process blocks of FIG. 4 may be performed by validation device 220. In some implementations, one or more process blocks of FIG. 4 may be performed by another device or a group of devices separate from or including validation device 220, such as user device 210, toll-free service device 230, streaming device 240, and/or third party input device 250.

As shown in FIG. 4, process 400 may include receiving registration information for registering a resource identifier, associated with streaming media content, for use with a toll-free data service (block 410). For example, validation device 220 may receive registration information, for registering a resource identifier, from third party input device 250 via network 260. The resource identifier may be a string of characters used to identify a name of a resource in which such identification enables interactions with representations of the resource over a network. For example, a resource identifier may be a uniform resource identifier (URI), a uniform resource locator (URL), a uniform resource name (URN), or the like. The registration information for registering the resource identifier may be generated, for example, from a registration process available to a third party using third party input device 250.

In some implementations, the registration information for registering the resource identifier may include a content identifier. The content identifier may include information that identifies the streaming media content (e.g., video, audio, etc.) associated with the resource identifier. For example, the content identifier may be a string of characters used as a label or a designator in association with the media content (e.g., "Movie 1").

Additionally, or alternatively, the registration information for registering the resource identifier may include a provider identifier. The provider identifier may include information that identifies a service provider who may provide the streaming media content. For example, the provider identifier may include a name of the service provider (e.g., "Movie Co."), a customer number (e.g., "34215"), or the like.

Additionally, or alternatively, the registration information for registering the resource identifier may identify a content type. The content type may include information that identifies a type of content (e.g., streaming media content (e.g., video or audio), a webpage, a document, etc.) associated with the resource identifier. In some implementations, streaming media content may be registered through a registration process in which other content may also be registered. The content type may allow validation device 220 to differentiate between streaming media content and other content which may be validated in a different manner.

Additionally, or alternatively, the registration information for registering the resource identifier may include information about the resource identifier. The information about the resource identifier may include the resource identifier, and information that identifies a character string included in the resource identifier. The character string may be any portion of the resource identifier (e.g., a string of one or more characters). For example, if the resource identifier is "http://example.video1/1.vid," the character string may be "example.video1/," "example.video1," "video1," "ple.vid," or any other portion of the resource identifier. The information that identifies the character string may be the character string or a start point and end point of the resource identifier from which to make the character string. For example, if the resource identifier is "http://example.video1/1.vid," the character string "example.video1/" may be the information that identifies the character string, or a start point of eight (representing the eighth character in the resource identifier, 'e') and an end point of 22 (representing the 22nd character in the resource identifier, "/") may be the information that identifies the character string ("example.video1/"). Additionally, or alternatively, the information that identifies a character string may be a start point and a length. In the above example, to obtain the character string "example.video1/", the start point would be eight and the length would be 15.

In some implementations, the character string may be associated with one or more resource identifiers, that may be associated with the streaming content, because the character string is a match for a portion of the resource identifiers. For example, the character string "example.video1/" is associated with resource identifiers like "http://example.video1/1.vid," "http://example.video1/2.vid," and "http://example.video1/3.vid," because the character string matches a portion of the resource identifiers. The character string may used to generate a signature, as described below, and may be chosen for an association with the one or more resource identifiers.

In some implementations, the registration information may be associated with streaming media content. Streaming media content may be a video, music, or any other content which is normally provided through a continuous flow of data. In some implementations, the streaming media content may be composed of multiple segments containing a part of the streaming media content corresponding to multiple time periods of the media content. Furthermore, each time period of the media content may be associated with more than one segment, which may be of varying quality (e.g., bit rate). Each segment of the multiple segments may have a particular resource identifier associated with the segment. The multiple segments may be associated with one or more index files that set an order for the multiple segments and categorize the multiple segments by bit rate using the particular resource identifiers associated with the segments. The index file may allow the streaming media content to be played in an intended order with options for the bit rate. Furthermore, the streaming media content may be hosted on multiple content data networks (CDNs) or by multiple servers to allow flexibility with changing network conditions and to improve streaming. Each CDN or server may have a similar quantity of segments of media content for the streaming media content, but the segments may be associated with different resource identifiers that identify a different location on a network (e.g., a particular server, data center, CDN, etc.).

In some implementations, the resource identifier and the streaming media content may be associated with a toll-free data service. Toll-free data service may be a means of providing content (e.g., streaming media content) that the service provider wishes to provide to user device 210 for free by subsidizing the cost of network data usage associated with receiving the content. For example, a movie company may identify a preview of a movie as part of the toll-free data service, so that user device 210 may watch the preview without the network data usage associated with watching the video accruing against a total amount of network data usage for user device 210.

As further shown in FIG. 4, process 400 may include identifying, based on the registration information, a character string of the resource identifier to be used to generate a signature for validating toll-free access to the streaming media content (block 420). For example, validation device 220 may identify a character string of the resource identifier based on the registration information. In some implementations, the character string may be directly provided in the registration information (e.g., the registration information may include information that identifies the character string). In some implementations, the character string may be generated by validation device 220, as described herein.

The character string may be associated with multiple resource identifiers because the character string is a match for a portion of the resource identifiers. For example, the character string "example.video1/" is associated with resource identifiers like "http://example.video1/1.vid," "http://example.video1/2.vid," and "http://example.video1/3.vid," because the character string matches a portion of all of these resource identifiers. In this way, the character string may be associated with multiple resource identifiers related to the streaming media content. In some implementations, the service provider may create resource identifiers with similar names for segments of the streaming media content. For example, "http://example.video1/1.vid," "http://example.video1/2.vid," and "http://example.video1/3.vid" may all identify segments of a video, and all may include the character string "example.video1/". By giving the resource identifiers similar names, the service provider may allow a character string to be picked which can be used to identify and separate different segments of the streaming media content in which the character string is included and which can be used to exclude other content, which does not include the character string, that is not part of the streaming media content or the toll-free data service. For example, the character string "example.video1/" may be associated with all the resource identifiers associated with Video 1 (e.g., "http://example.video1/7.vid"), but may be set up in such a manner that it is not associated with Video 2, because all of the resource identifiers for Video 2 may include the character string "example.video2/." Hence, a character string may be used to identify particular streaming media content, while excluding other particular media content.

In some implementations, when the registration information includes information that identifies a character string, validation device 220 may verify that the character string is associated with the resource identifier included in the registration information by ensuring that the character string is a part of the resource identifier. If the character string is not part of the resource identifier, validation device 220 may query third party input device 250 for a character string which is part of the resource identifier.

In some implementations, when the registration does not include information that identifies a character string or the character string is not associated with the resource identifier (e.g., the character string is not part of the resource identifier), then validation device 220 may generate the character string. Validation device 220 may generate the character string by analyzing similarities between the resource identifier from the registration information and other resource identifiers that may be included in the registration information. Additionally, or alternatively, validation device 220 may generate the character string by analyzing similarities between the resource identifier and resource identifiers, associated with the toll-free data service, that validation device 220 has stored in memory (either associated with the streaming media content or another streaming media content). Validation device 220 may attempt to generate the character string to identify multiple resource identifiers (e.g., when the character string is associated with the multiple resource identifiers), while excluding resource identifiers not associated with the toll-free data service and/or the streaming media content.

In some implementations, validation device 220 may generate the character string starting a threshold amount of characters from the beginning of the resource identifier (e.g., starting at the eighth character of the resource identifier). Additionally, or alternatively, validation device 220 may generate the character string ending a threshold amount of characters from the end of the resource identifier (e.g., ending three characters from the end of the resource identifier to eliminate the file extension). Additionally, or alternatively, validation device 220 may utilize delimiters in deciding how to generate the character string that validation device 220 will use to identify the resource identifier (e.g., the character string may exclude all characters after the last "/" in the resource identifier). Validation device 220 may send the character string to the service provider so that the service provider can verify that the character string does not identify content that is not part of the toll-free data service.

In some implementations, the character string may be used to generate a signature. In some implementations, the signature can be used to validate the resource identifier and provide toll-free access to the streaming media content for user device 210 as described below. Toll-free access may include access that is associated with toll-free data service and does not count against the network data usage of user device 210. The signature may aid in providing toll-free access as described below.

As further shown in FIG. 4, process 400 may include generating the signature based on the character string (block 430). For example, validation device 220 may generate a signature based on the character string. In some implementations, the signature may include information that identifies the character string. The toll-free service device 230 may later ensure that the character string, identified from the signature, matches a portion of the resource identifier (e.g., may verify that the character string is included in the resource identifier) when determining that the resource identifier is associated with toll-free services. Additionally, or alternatively, the signature may be encrypted using public-key encryption to aid in verifying that the signature was made by validation device 220, and to keep the character string private.

In some implementations, the signature may include a provider identifier. The provider identifier may be included so that network data usage associated with the streaming media content may be charged to the service provider and not accrued for user device 210.

Additionally, or alternatively, validation device 220 may associate a validation time period with the signature. The validation time period may identify a time period during which the signature is usable. If the validation time period expires (e.g., usable threshold amount of time elapses), then the signature may not be used.

As further shown in FIG. 4, process 400 may include storing the signature (block 440). For example, validation device 220 may store the signature, so that the signature can be provided to user device 210 at a later time. In some implementations, the signature may be stored, in a data structure along with other associated information. For example, the data structure may link the signature with the resource identifier, the character string, the provider identifier, the content identifier, the content type, or the like.

Implementations described in association with FIG. 4 may make the process of tracking network data usage of streaming media content associated with a toll-free data service less burdensome by implementing toll-free access to the streaming media content using a signature. The signature, generated as described in association with FIG. 4, can be used to validate one or more resource identifiers associated with segments of media content associated with a toll-free data service. Because the signature may be used to validate one or more resource identifiers, each resource identifier does not need to be validated through a separate process and therefore traffic is reduced and resources are saved.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
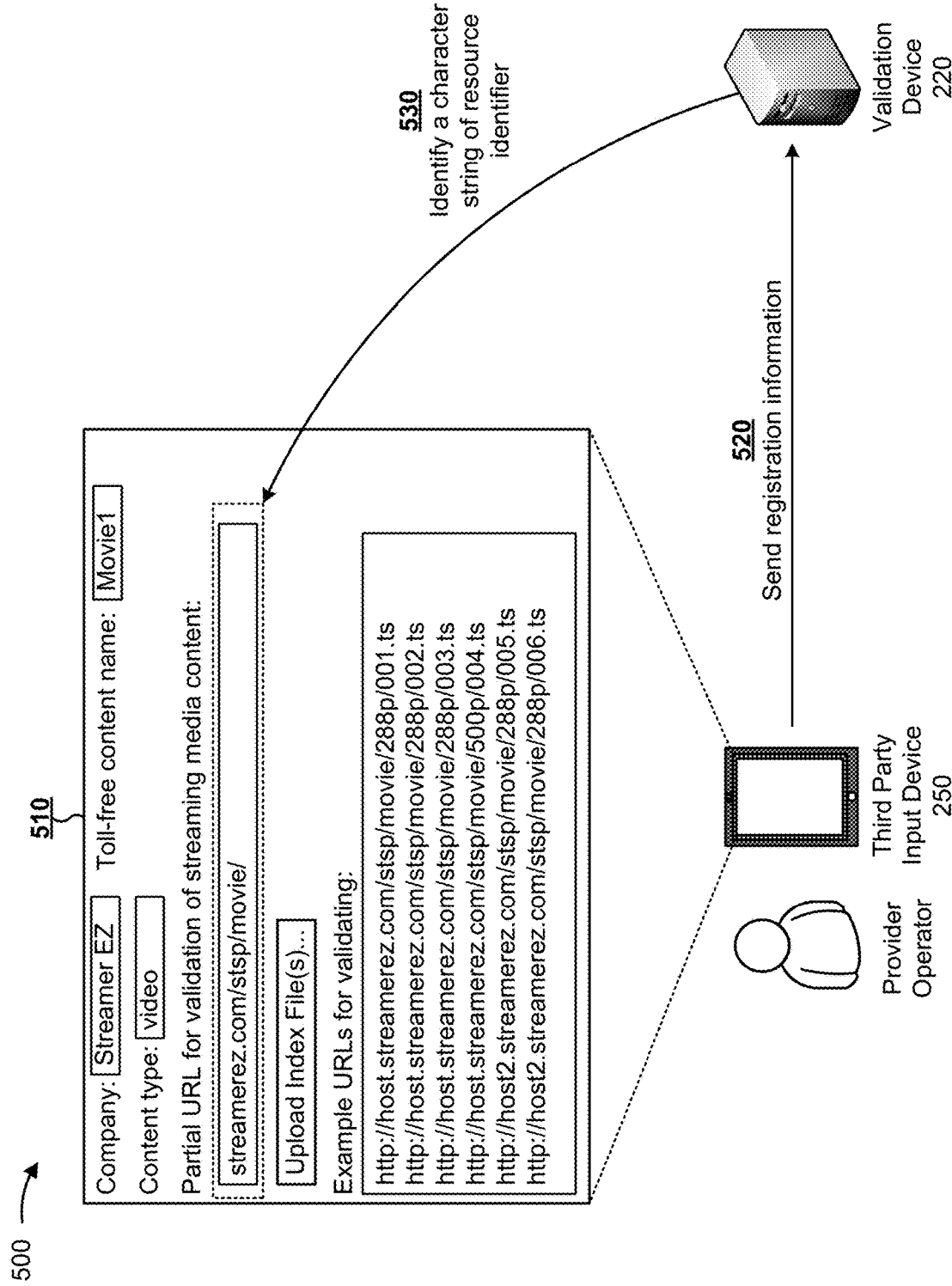
FIGS. 5A and 5B are diagrams of an example implementation relating to the example process shown in FIG. 4.
Figure 5B:
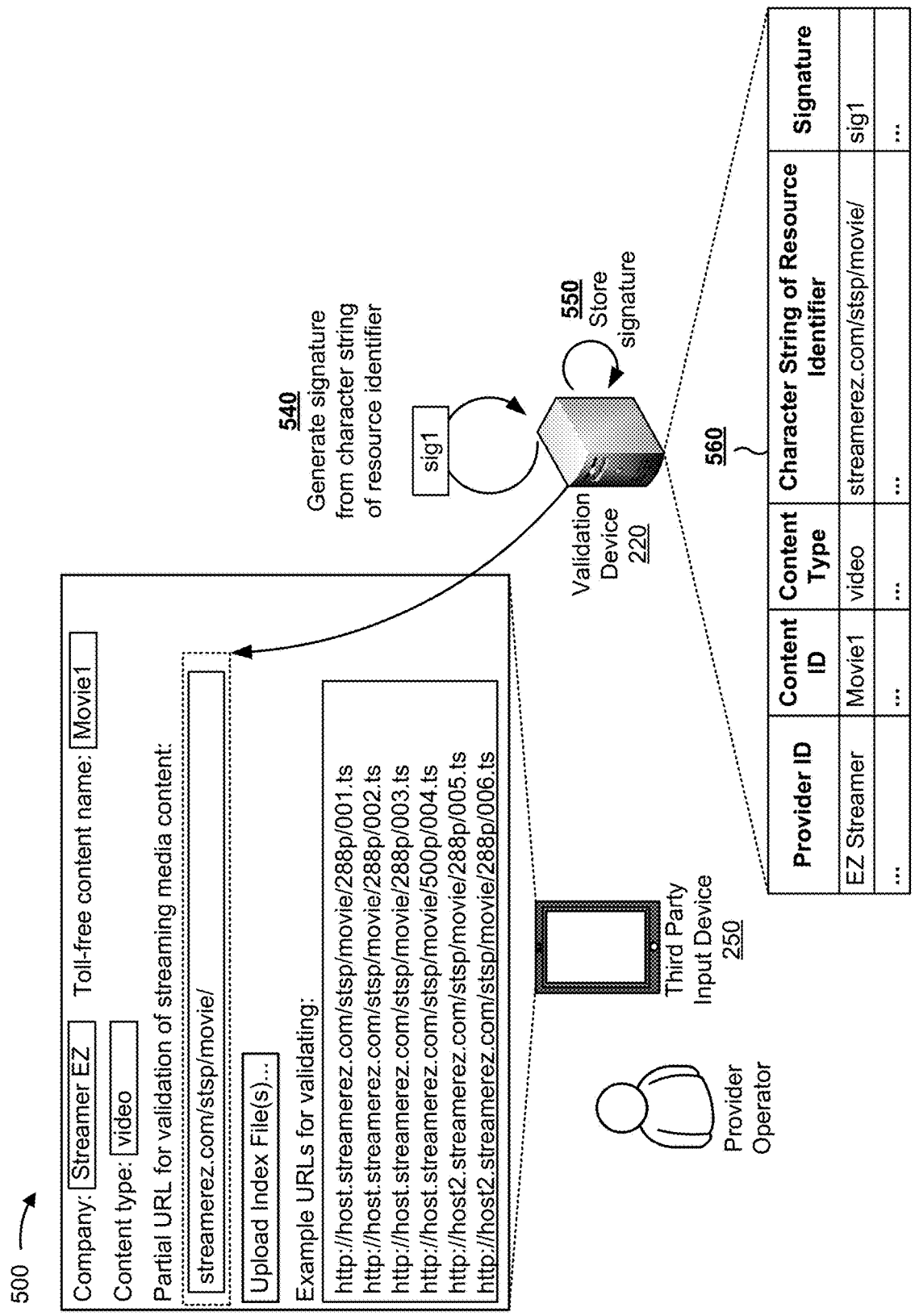

FIGS. 5A and 5B are diagrams of an example implementation 500 relating to example process 400 shown in FIG. 4. FIGS. 5A and 5B show an example of creating a signature for a resource identifier, associated with streaming media content, registered for a toll-free data service.

As shown in FIG. 5A, and by reference number 510, assume that a third party user (e.g., a user associated with a service provider) uses third party input device 250 to input registration information about streaming media content that the third party wants to provide to customers using a toll-free data service. In the given example, the provider operator enters, as shown, a company name (e.g., Streamer EZ), a toll-free content name (e.g., Movie1), a content type (e.g., video), a partial uniform resource locator (URL) for validation of streaming media content (e.g., "streamerez.com/stsp/movie1/"), and a number of URLs, which could be validated using the partial URL (e.g., meaning that the URLs contain the partial URL). In the provided example, the partial URL is a middle section of the URLs and does not identify the host or the exact folder the file is in. In the provided example, the URLs are resource identifiers, and the partial URL is a character string of a resource identifier. As shown by reference number 520, the third party input device 250 sends the registration information to validation device 220. As shown by reference number 530, validation device 220 identifies the character string of the resource identifier, which in this case is the partial URL from the registration information ("streamerez.com/stsp/movie," as shown).

As shown in FIG. 5B, and by reference number 540, validation device 220 generates a signature from the character string of the resource identifier ("sig1"). As shown by reference number 550, validation device 220 stores the signature. As shown by reference number 560, the signature ("sig1") is stored in a data structure, which associates the signature with a provider identifier (e.g., "EZ Streamer"), a content identifier (e.g., "Movie1"), a content type (video), and the character string of the resource identifier (e.g., "stremerez.com/stsp/movie").

Because the character string is associated with multiple resource identifiers, the signature, associated with the character string, is also associated with multiple resource identifiers. When user device 210 validates the resource identifier with validation device 220, user device 210 will receive and store the signature. The signature can be used to more effectively allow toll-free access to streaming media content while reducing traffic associated with validating resource identifiers associated with the segments of the streaming media content since multiple resource identifiers are associated with the signature.

As indicated above, FIGS. 5A and 5B are provided merely as an example. Other examples are possible and may differ from what was described with regard to FIGS. 5A and 5B.

FIG. 6 is a flow chart of an example process 600 for validating a resource identifier with a signature to receive toll-free access to streaming media content. In some implementations, one or more process blocks of FIG. 6 may be performed by user device 210. In some implementations, one or more process blocks of FIG. 6 may be performed by another device or a group of devices separate from or including user device 210, such as validation device 220, toll-free service device 230, streaming device 240, and/or third party input device 250.

As shown in FIG. 6, process 600 may include determining a resource identifier for accessing a segment of streaming media content (block 610). For example, user device 210 may determine a resource identifier for accessing a segment of streaming media content. In some implementations, the resource identifier may be determined based on actions of a user associated with user device 210. For example, user device 210 may determine the resource identifier when the user clicks on a uniform resource locator (URL). Additionally, or alternatively, user device 210 may identify the resource identifier based on the resource identifier's position in an index file of the streaming media content. For example, user device 210 may identify the resource identifier to access a next segment of streaming media content that follows a current segment of streaming media content in the index file.

In some implementations, the resource identifier will identify a segment of streaming media content, as opposed to an entirety of the streaming media content, because the streaming media content is broken into segments that are associated with the index file. Segments of streaming media content may allow for more efficient, adaptive, and higher quality streaming.

As further shown in FIG. 6, process 600 may include determining whether a signature for the resource identifier is stored in a memory and a validation time period of the signature is not expired (block 620). For example, user device 210 may determine whether user device 210 has the signature for the resource identifier stored in memory. In some implementations, user device 210 may compare the resource identifier to character strings of resource identifiers that user device 210 has in a data structure that associates signatures with character strings of resource identifiers. If no character string matches a portion of the resource identifier (e.g., the character string of "example.video1/" matches a portion of the resource identifier "http://example.video1/1.vid"), then user device 210 may not have the signature for the resource identifier stored in memory. If there is a character string that matches a piece of the resource identifier, then user device 210 may have the signature of the resource identifier.

In some implementations, the signature may be associated with a validation time period that was provided to user device 210 by validation device 220 when user device 210 received the signature. The validation time period may set a threshold amount of time for which the signature may be used to validate the resource identifier. User device 210 may identify the validation time period associated with the signature from the data structure and compare the validation time period with a current time to see if the threshold is satisfied (e.g., the current time is within the validation time period).

As further shown in FIG. 6, if the signature for the resource identifier is stored in memory and the validation time period of the signature is not expired (block 620—YES), then process 600 may include requesting the segment of streaming media content using the resource identifier and the signature to receive toll-free access to the segment (block 630). For example, user device 210 may request the segment of streaming media content by sending a message, to toll-free service device 230 via network 260, that includes the resource identifier and the signature. In some implementations, toll-free service device 230 may request the segment of streaming media content from streaming device 240. In some implementations, streaming device 240 may provide the segment of streaming media content directly to user device 210. In some implementations, streaming device 240 may provide the segment of streaming media content to user device 210 via toll-free services device 230 or another device.

In some implementations, toll-free service device 230 may verify that the signature is associated with the resource identifier before granting user device 210 toll-free access. Toll-free service device 230 may verify the signature by, for example, decrypting the signature and identifying that the character string included in the signature is a part of the resource identifier. Additionally, or alternatively, toll-free service device 230 may verify that the validation time period associated with the signature is not expired before granting user device 210 toll-free access.

In some implementations, when the signature is verified and the validation time period is not expired, toll-free service device 230 may tally network data usage associated with the segment of media content so that the network data usage does not accrue for user device 210. Instead, the network data usage may accrue for a service provider, identified based on the signature, that is providing a toll-free data service.

As further shown in FIG. 6, if the signature for the resource identifier is not stored in memory or a validation time period of the signature is expired (block 620—NO), then process 600 may include requesting validation of the resource identifier (block 640). For example, user device 210 may request validation of the resource identifier. In some implementations, user device 210 may request validation of the resource identifier by sending the resource identifier to validation device 220 via network 260.

As further shown in FIG. 6, process 600 may include receiving a signature for the resource identifier based on requesting the validation (block 650). For example, user device 210 may receive the signature of the resource identifier based on requesting the validation of the resource identifier. In some implementations, validation device 220 will compare the resource identifier to character strings of resource identifiers associated with signatures in a data structure. If a character string matches part of the resource identifier, then the resource identifier may be associated with toll-free data services and validation device 220 may provide the signature associated with the character string to user device 210. In some implementations the signature may include the character string, the provider identifier, and/or the validation time period, as described above.

As further shown in FIG. 6, process 600 may include storing the signature in memory (block 660). For example, user device 210 may store the signature in memory (e.g., in a data structure). In some implementations, user device 210 may store the signature in a data structure with the character string of the resource identifier and the validation time period. User device 210 may link the signature with the character string and the validation time period in the data structure. Additionally, or alternatively, the character string may be associated with one or more resource identifiers, in addition to the resource identifier, as described above.

In some implementations, user device 210 may obtain both the character string and the validation time period from the signature. In some implementations, user device 210 may receive the validation time period separately from the signature.

As further shown in FIG. 6, after the signature is stored in memory, user device 210 may request the segment of streaming media content using the resource identifier and the signature to receive toll-free access to the segment, as described above in connection with block 630.

Implementations described in association with FIG. 6 may make the process of tracking network data usage of streaming media content associated with a toll-free data service less burdensome by implementing toll-free access to the streaming media content using a signature. The signature can be used to validate one or more resource identifiers associated with segments of media content associated with a toll-free data service. Because the signature may be used to validate one or more resource identifiers, each resource identifier does not need to be validated through a separate process and therefore traffic is reduced and processor and memory resources are saved.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7A:
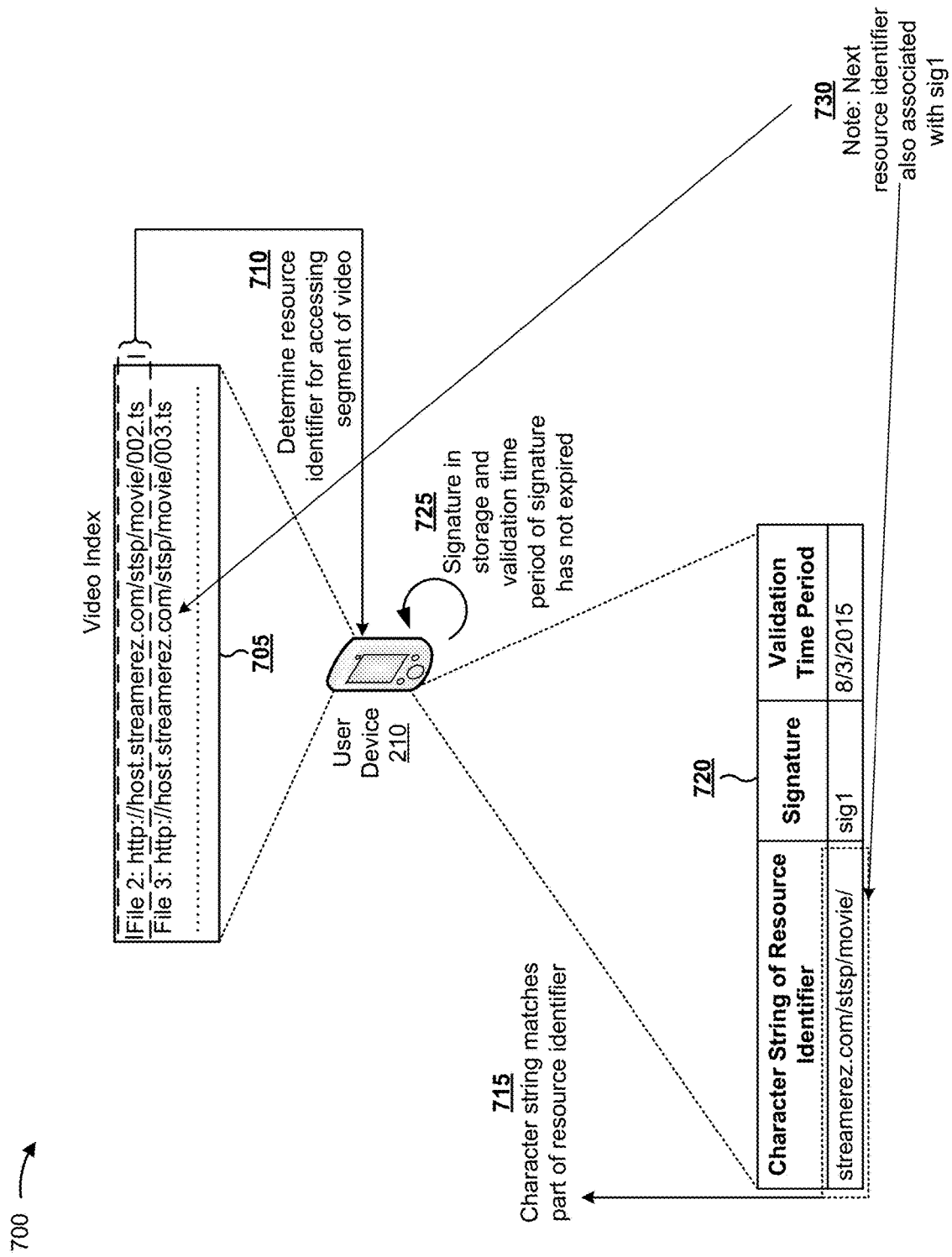
FIGS. 7A and 7B are diagrams of an example implementation relating to the example process shown in FIG. 6.
Figure 7B:
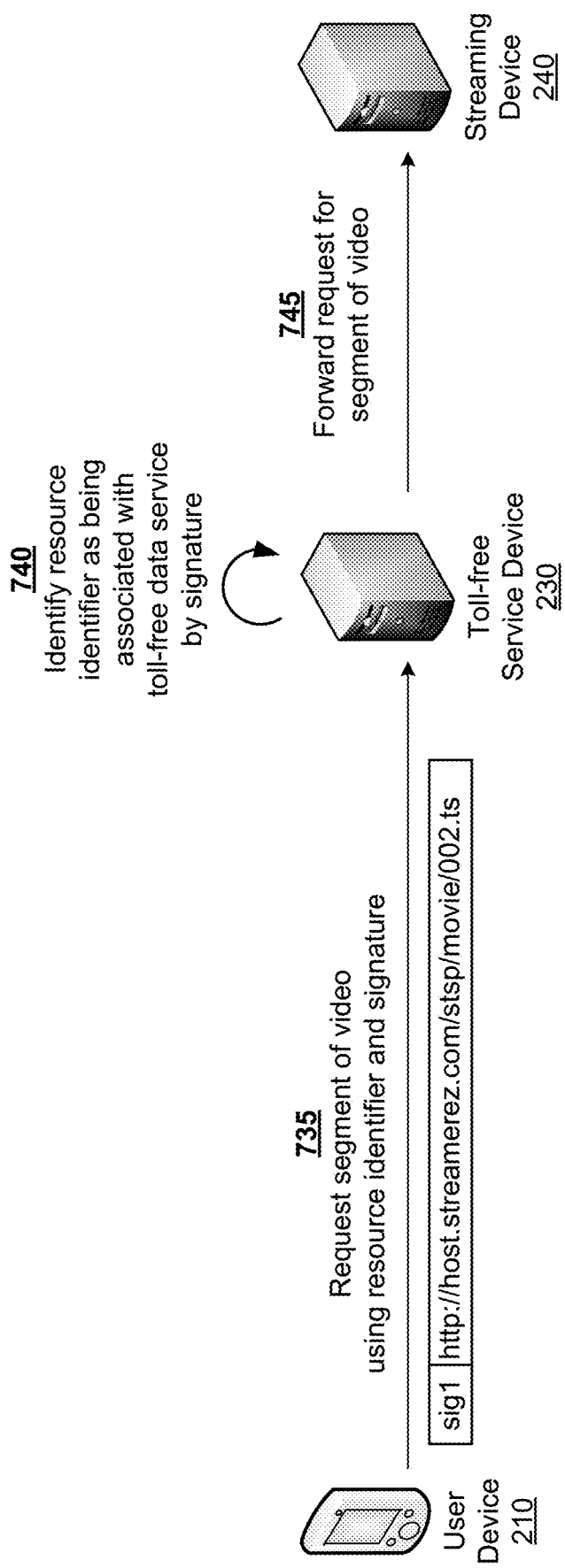

FIGS. 7A and 7B are diagrams of an example implementation 700 relating to example process 600 shown in FIG. 6. FIGS. 7A and 7B show an example of validating a resource identifier with a signature, to receive toll-free access to streaming media content, when the user device has the signature stored in memory.

As shown in FIG. 7A, and by reference number 705, assume that user device 210 is playing a video using a video index, as shown. As shown by reference number 710, user device 210 determines a resource identifier for accessing a segment of the video by using the video index. In the provided example, user device 210 identifies "http://host-.streamerez.com/stsp/movie/002.ts" as the resource identifier because this resource identifier was next in the index file.

As shown by reference number 715, user device 210 compares the resource identifier to character strings of resource identifiers stored in memory and finds a match between a part of the resource identifier and the character string. As shown by reference number 720, the character string is "streamerez.com/stsp/movie/," which is associated with the signature, "sig1," which has a validation time period that expires on Aug. 3, 2015. As shown be reference number 725, user device 210 determines that user device 210 has the signature ("sig1") stored in memory and that the validation time period is not expired (assuming that the current date is prior to Aug. 3, 2015). As shown by reference number 730, the next resource identifier in the video index is also associated with "sig1." The character string associated with "sig1" ("streamerez.com/stsp/movie/") matches a part of the next resource identifier, which is "http://host-.streamerez.com/stsp/movie/003.ts," so user device 210 can use the signature for the next resource identifier as well, thereby conserving network resources.

As shown in FIG. 7B, and by reference number 735, user device 210 requests a segment of the video using the resource identifier and the signature. As shown by reference number 740, toll-free service device 230 identifies the resource identifier as being associated with a toll-free data service by using the signature. Toll-free service device 230 uses the signature by decrypting the signature and identifying that the character string from the signature matches a part of the resource identifier. By verifying that the character string and the resource identifier match, toll-free service device 230 verifies that the resource identifier is associated with a toll-free data service. As shown by reference number 745, toll-free service device 230 forwards the request for the segment of video to streaming device 240, which provides the segment to user device 210.

As indicated above, FIGS. 7A and 7B is provided merely as an example. Other examples are possible and may differ from what was described with regard to FIGS. 7A and 7B.

Figure 8A:
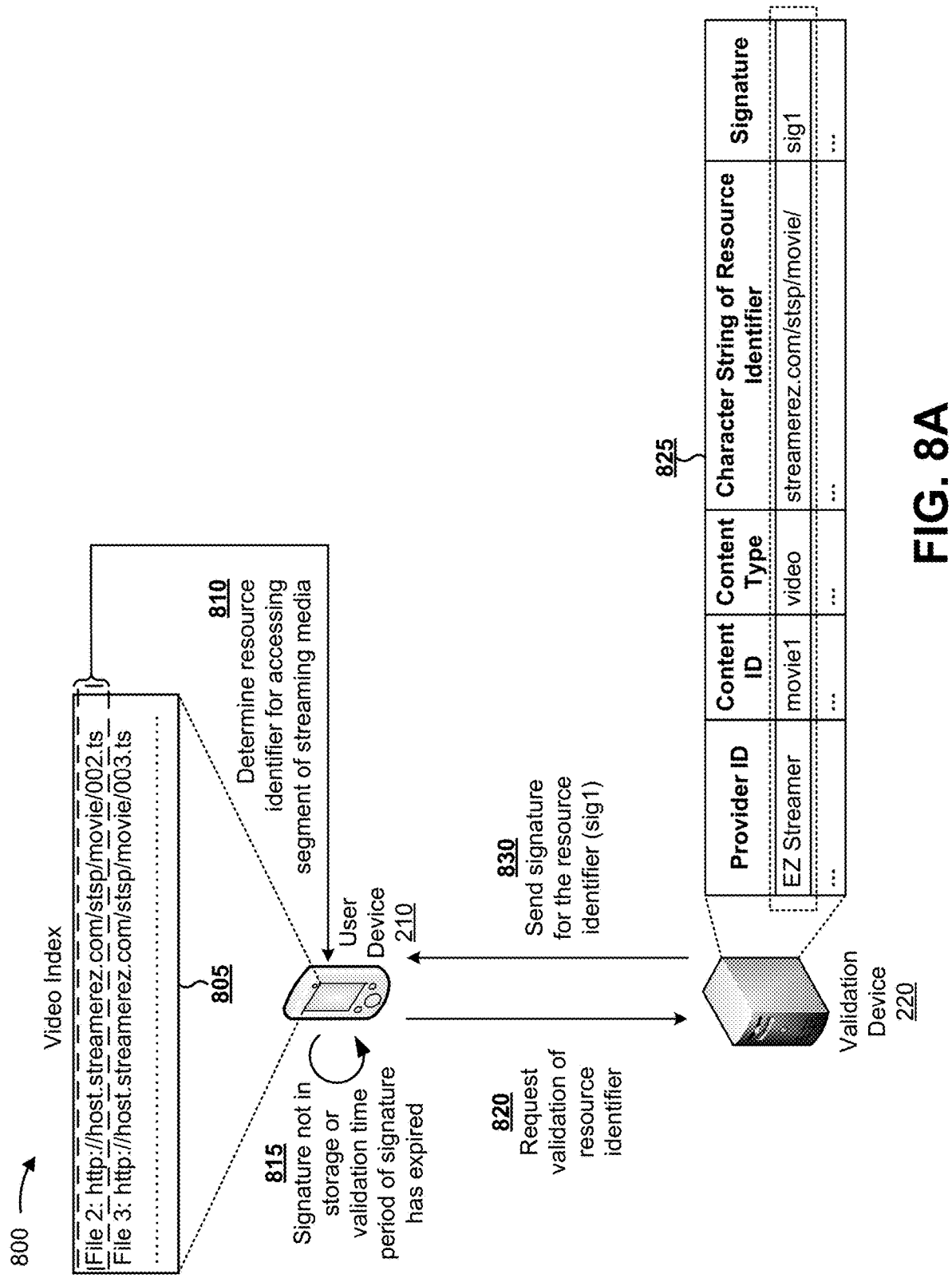
FIGS. 8A and 8B are diagrams of another example implementation relating to the example process shown in FIG. 6.
Figure 8B:
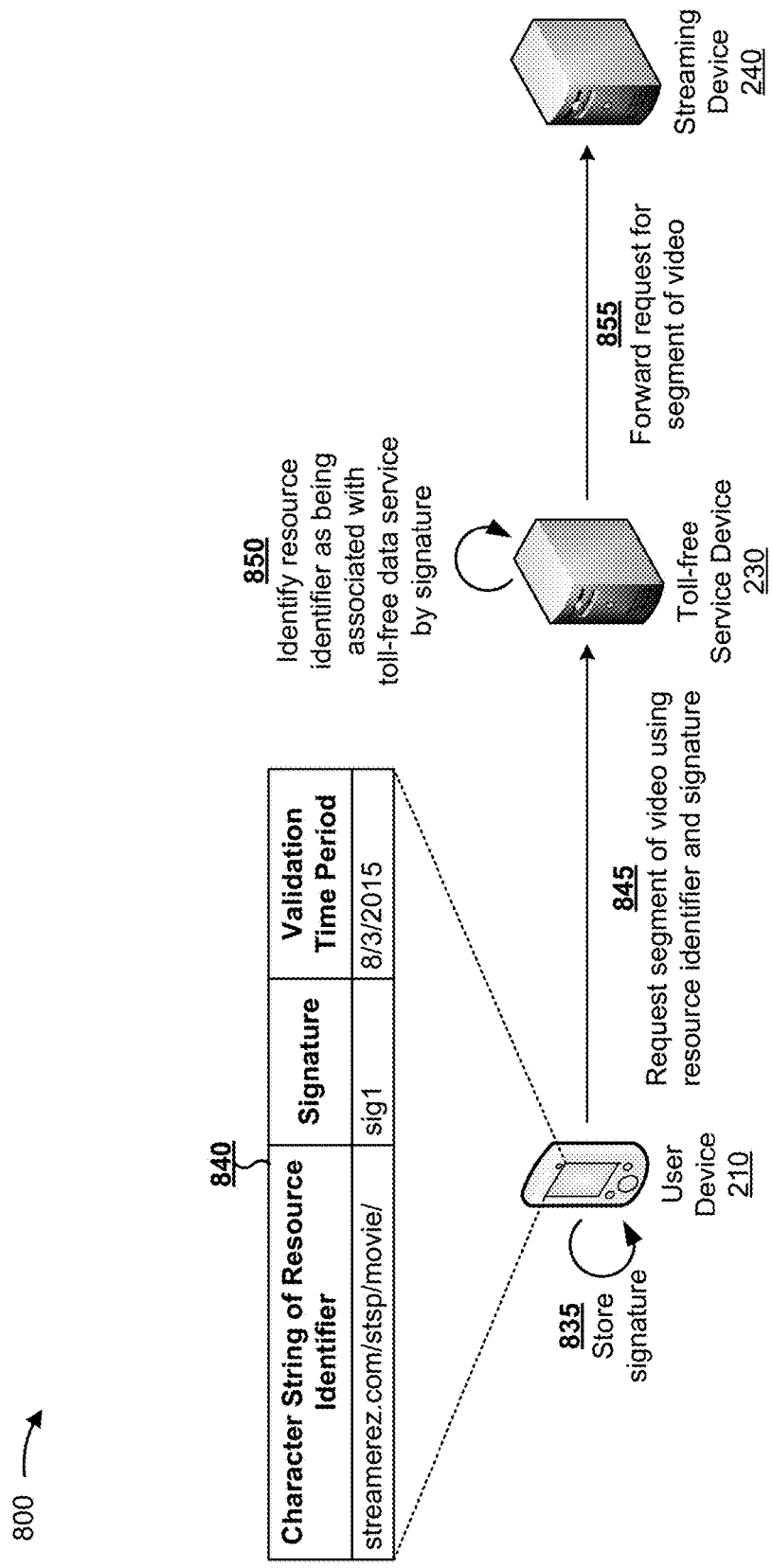

FIGS. 8A and 8B are diagrams of another example implementation 800 relating to example process 600 shown in FIG. 6. FIGS. 8A and 8B show an example of validating a resource identifier with a signature, to receive toll-free access to streaming media content, when the user device does not store the signature in memory.

As shown in FIG. 8A, and by reference number 805, assume that user device 210 is playing a video using a video index as shown. As shown by reference number 810, user device 210 determines a resource identifier for accessing a segment of the video by using the video index. In the provided example, user device 210 identifies "http://host-.streamerez.com/stsp/movie/002.ts" as the resource identifier because the resource identifier was next in the index file. As shown by reference number 815, assume that user device 210 does not store a signature for the resource identifier in memory, or that the validation time period of the signature is expired. As shown by reference number 820, user device 210 will request validation of the resource identifier by validation device 220. As shown by reference number 825, validation device 220 matches the resource identifier to a character string of the resource identifier to determine an associated signature. In the provided example, "sig1" is the associated signature for the resource identifier. As shown by reference number 830, validation device 220 sends, to user device 210, the signature for the resource identifier (e.g., "sig1").

As shown in FIG. 8B, and by reference number 835, user device 210 stores the signature, provided by validation device 220, for future use. As shown by reference number 840, user device 210 stores the signature in a data structure that associates the signature with the character string and the validation time period. The character string may be used for the resource identifier or other resource identifiers that contain the character string. As shown by reference number 845, user device 210 requests a segment of the video using the resource identifier and the signature. As shown by reference number 850, toll-free service device 230 identifies the resource identifier as being associated with a toll-free data service by using the signature. As shown by reference number 855, toll-free service device 230 sends the request, to streaming device 240, for the segment of the video.

Once the request is provided to streaming device 240, streaming device 240 provides the streaming media content to user device 210. A device (e.g., toll-free service device 230) may track the network data usage associated with video segment and charge the service provider based on this network data usage.

By using the signature to validate the toll-free services, network traffic associated with validation is reduced because the signature may be associated with multiple resource identifiers. This may lead to a significant savings of network and computing resources when used with streaming media content, because the streaming media content may be associated with many resource identifiers As indicated above, FIGS. 8A and 8B are provided merely as an example. Other examples are possible and may differ from what was described with regard to FIGS. 8A and 8B.

Implementations described herein may make the process of tracking network data usage of streaming media content associated with a toll-free data service less burdensome by implementing toll-free access to the streaming media content using a signature. The signature can be used to validate one or more resource identifiers associated with segments of media content associated with a toll-free data service. Because the signature may be used to validate one or more resource identifiers, each resource identifier, of the many resource identifiers that may be associated with one streaming media content, does not need to be validated through a separate process. Therefore implementations described herein may reduce traffic and save processor resources.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
a memory to store instructions; and
one or more processors to execute the instructions to:
    determine a resource identifier for accessing a segment of streaming media content;
    determine that a signature associated with the resource identifier is not stored in memory;
    request validation of the resource identifier based on determining that the signature is not stored in memory;
    receive the signature associated with the resource identifier based on requesting validation,
        the signature being based on a character string of the resource identifier,
            the character string being included in a plurality of resource identifiers that includes the resource identifier, the plurality of resource identifiers corresponding to a plurality of segments of streaming media content for which toll-free access is permitted,
            the character string matching a portion of all resource identifiers of the plurality of resource identifiers,
            the character string being used to identify the plurality of segments of streaming media content in which the character string is included and exclude other streaming media content which does not include the character string,
            the plurality of segments of streaming media content being associated with multiple time periods of streaming media content,
            each time period of streaming media content, of the multiple time periods of streaming media content, being associated with more than one segment, of the plurality of segments of streaming media content, with varying bit rates, and
            the plurality of segments of streaming media content being associated with one or more index files that set an order for the plurality of segments of streaming media content based on a time period, of the multiple time periods of streaming media content, and categorize the plurality of segments of streaming media content by bit rate using the plurality of resource identifiers;
    store the signature in memory based on receiving the signature; and request the segment of streaming media content using the resource identifier and the signature, stored in memory, to receive toll-free access to the segment of streaming media content.

2. The device of claim 1, where the one or more processors are further to:
determine another resource identifier for accessing another segment of streaming media content;
determine that the signature, associated with the resource identifier, is also associated with the other resource identifier and is stored in memory; and
request the other segment of streaming media content using the other resource identifier and the signature, stored in memory, to receive toll-free access to the other segment of streaming media content.

3. The device of claim 1, where the one or more processors are further to:
determine another resource identifier for accessing another segment of streaming media content;
determine that the signature, associated with the resource identifier, is also associated with the other resource identifier and is stored in memory;
determine that a validation time period, associated with the signature, has expired; and
request validation of the other resource identifier based on determining that the validation time period has expired.

4. The device of claim 1, where the signature is generated based on registration information associated with a service provider that provides toll-free access to the segment of streaming media content.

5. The device of claim 1, where the character string of the resource identifier is identified based on registration information associated with a service provider that provides toll-free access to the segment of streaming media content.

6. The device of claim 1, where the character string is determined based on analyzing the plurality of resource identifiers corresponding to the plurality of segments of streaming media content.

7. A non-transitory computer-readable medium storing instructions, the instructions comprising:
one or more instructions that, when executed by one or more processors, cause the one or more processors to:
identify a resource identifier for accessing a segment of streaming media content associated with a toll-free data service;
determine that a signature, associated with a plurality of resource identifiers that includes the resource identifier, is not stored in memory or that a validation time period has expired;
request validation of the resource identifier based on determining that the signature is not stored in memory or that the validation time period has expired;
receive the signature associated with the plurality of resource identifiers based on requesting validation,
the signature being based on a character string that matches a portion of all resource identifiers of the plurality of resource identifiers, the plurality of resource identifiers corresponding to a plurality of segments of streaming media content associated with the toll-free data service,
the character string being used to identify the plurality of segments of streaming media content in which the character string is included and exclude other streaming media content which does not include the character string,
the plurality of segments of streaming media content being associated with multiple time periods of streaming media content,
each time period of streaming media content, of the multiple time periods of streaming media content, being associated with more than one segment, of the plurality of segments of streaming media content, with varying bit rates, and
the plurality of segments of streaming media content being associated with one or more index files that set an order for the plurality of segments of streaming media content based on a time period, of the multiple time periods of streaming media content, and categorize the plurality of segments of streaming media content by bit rate using the plurality of resource identifiers;
store the signature in memory based on receiving the signature; and
request the segment of streaming media content using the resource identifier and the signature, stored in memory, to receive toll-free access to the segment of streaming media content.

8. The non-transitory computer-readable medium of claim 7, where the one or more instructions, when executed by the one or more processors, further cause the one or more processors to:
determine another resource identifier, included in the plurality of resource identifiers, for accessing another segment of streaming media content;
determine that the signature, associated with the plurality of resource identifies, is stored in memory; and
request the other segment of streaming media content using the other resource identifier and the signature, stored in memory, to receive toll-free access to the other segment of streaming media content.

9. The non-transitory computer-readable medium of claim 7, where the one or more instructions, that cause the one or more processors to identify the resource identifier, cause the one or more processors to:
identify the resource identifier using an index file, of the one or more index files, that includes the plurality of resource identifiers.

10. The non-transitory computer-readable medium of claim 7, where the validation time period identifies a time period during which the signature is valid.

11. The non-transitory computer-readable medium of claim 7, where the signature is generated based on registration information associated with a service provider that provides toll-free access to the segment of streaming media content.

12. The non-transitory computer-readable medium of claim 7, where the character string, included in the plurality of resource identifiers, is provided in registration information associated with a service provider that provides toll-free access to the segment of streaming media content.

13. The non-transitory computer-readable medium of claim 7, where the signature includes information that identifies a service provider to be charged for network data usage associated with the segment of streaming media content.

14. A method, comprising:
receiving, by a device, registration information for registering a plurality of resource identifiers, corresponding to a plurality of segments of streaming media content, for use with a toll-free data service;
identifying, by the device and based on the registration information, a character string included in all of the plurality of resource identifiers to be used to generate a signature for validating toll-free access to the plurality of segments of streaming media content, the character string being used to identify the plurality of segments of streaming media content in which the character string is included and exclude other streaming media content which does not include the character string, the plurality of segments of streaming media content being associated with multiple time periods of streaming media content, each time period of streaming media content, of the multiple time periods of streaming media content, being associated with more than one segment, of the plurality of segments of streaming media content, with varying bit rates, and the plurality of segments of streaming media content being associated with one or more index files that set an order for the plurality of segments of streaming media content based on a time period, of the multiple time periods of streaming media content, and categorize the plurality of segments of streaming media content by bit rate using the plurality of resource identifiers;

generating, by the device, the signature based on the character string; and storing, by the device, the signature.

15. The method of claim 14, further comprising:

receiving a request for validation of a resource identifier, of the plurality of resource identifiers, from a user device; and providing, to the user device, the signature for the resource identifier based on the request, the signature to be used with the resource identifier in requesting toll-free access to a segment of streaming media content included in the plurality of segments of streaming media content, and the signature to be stored in memory of the user device.

16. The method of claim 14, where the registration information includes information that identifies the character string.

17. The method of claim 14, where generating the signature comprises:

generating the signature to include information that identifies a third party to be charged for network data usage based on the registration information.

18. The method of claim 14, where the plurality of segments of streaming media content includes video content or audio content.

19. The method of claim 14, where a resource identifier, of the plurality of resource identifiers, is a uniform resource identifier (URI).

20. The method of claim 14, where a resource identifier, of the plurality of resource identifiers, includes a string of characters used to identify a name of a resource, in which such identification enables interactions with representations of the resource over a network.

* * * * *